United States Patent
Guo

(10) Patent No.: US 9,323,127 B2
(45) Date of Patent: Apr. 26, 2016

(54) ACTIVE SUBSTRATE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Jian Guo, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/513,498

(22) Filed: Oct. 14, 2014

(65) Prior Publication Data
US 2015/0370141 A1    Dec. 24, 2015

(30) Foreign Application Priority Data
Jun. 24, 2014    (CN) .......................... 2014 1 0287482

(51) Int. Cl.
*G02F 1/167* (2006.01)
*G02B 5/20* (2006.01)
(Continued)

(52) U.S. Cl.
CPC ................ *G02F 1/167* (2013.01); *G02B 5/201* (2013.01); *G02B 26/005* (2013.01);
(Continued)

(58) Field of Classification Search
CPC ........ G02F 2001/133614; G02F 2001/133624; G02F 2202/108; G02F 2203/055; H01L 33/06
USPC ................................................. 359/290–297
See application file for complete search history.

(56) References Cited

U.S. PATENT DOCUMENTS

2005/0062912 A1* 3/2005 Otake ............... G02F 1/133555
349/114
2009/0002806 A1   1/2009 Skipor et al.
(Continued)

FOREIGN PATENT DOCUMENTS

| CN | 103226259 | A | 7/2013 |
| CN | 103226260 | A | 7/2013 |
| CN | 103293745 | A | 9/2013 |
| CN | 103309087 | A | 9/2013 |
| CN | 103412435 | A | 11/2013 |

(Continued)

OTHER PUBLICATIONS

First Office Action regarding Chinese application No. 201410287482.3, dated Dec. 21, 2015. Translation provided by Dragon Intellectual Property Law Firm.

*Primary Examiner* — Mahidere Sahle
(74) *Attorney, Agent, or Firm* — Harness, Dickey & Pierce, P.L.C.

(57) ABSTRACT

The present invention provides an active substrate and a display device for realizing color display of an electronic paper. The active substrate comprises a first substrate and a pixel electrode layer formed on the first substrate, and further comprises a color filter layer formed on the pixel electrode layer and a protective layer formed on the color filter layer, wherein the color filter layer comprises: a red sub-pixel unit, a green sub-pixel unit and a blue sub-pixel unit that are sequentially arranged; wherein the materials of the red sub-pixel unit, the green sub-pixel unit and the blue sub-pixel unit are quantum dot materials that emit red light, green light and blue light respectively when excited by the ambient light. The display device according to the present invention comprises an electrophoretic display device and an electrowetting display device.

12 Claims, 6 Drawing Sheets

(51) Int. Cl.
*G02B 26/00* (2006.01)
*G02F 1/1333* (2006.01)
*G02F 1/1335* (2006.01)
*G02B 1/14* (2015.01)

(52) U.S. Cl.
CPC ... *G02F 1/133345* (2013.01); *G02F 1/133617* (2013.01); *G02B 1/14* (2015.01); *G02F 2001/133614* (2013.01); *G02F 2001/133618* (2013.01); *G02F 2001/1676* (2013.01)

(56) References Cited

U.S. PATENT DOCUMENTS

| | | | |
|---|---|---|---|
| 2011/0157681 A1* | 6/2011 | Kwon | G02F 1/167 359/296 |
| 2011/0227080 A1 | 9/2011 | Roh et al. | |
| 2012/0320445 A1* | 12/2012 | Yang | G02B 26/005 359/290 |

FOREIGN PATENT DOCUMENTS

KR     20110090119 A     8/2011

* cited by examiner

ACTIVE SUBSTRATE AND DISPLAY DEVICE

CROSS REFERENCE TO RELATED APPLICATION

This application claims priority to Chinese Patent Application No. 201410287482.3 filed on Jun. 24, 2014, the disclosures of which are incorporated in their entirety by reference herein.

TECHNICAL FIELD

The present invention relates to the technical field of electronic papers, and in particular, to an active substrate, an electrophoretic display device and an electrowetting display device.

BACKGROUND

At present, display technology of an electronic paper mainly includes black-and-white display, and the electronic paper includes electronic paper that employs electrophoretic display mode and electronic paper in electrowetting display mode, etc.

For an electronic paper that employs electrowetting display mode, the substrate of the electronic paper is consisted of a white substrate, a transparent electrode and a hydrophobic surface, and a black oil drop exists between hydrophilic columns. Generally, the transparent electrode is driven by an active structure, for example, it is driven by a Thin Film Transistor (TFT) array. When a voltage is applied to the substrate, the oil drop contracts on one side of the hydrophilic columns, and the ambient incident light irradiates onto the white substrate and is reflected, and then seen by human eyes as white light beams, as shown in FIG. 1. When no voltage is applied to the substrate, the oil drop tiled on the hydrophobic surface, and the incident light is absorbed by the tiled black oil drop layer, thereby the object of black display is attained, as shown in FIG. 2. When color display is to be performed, red, green and blue tricolor oil drops are feed into each unit respectively, as shown in FIG. 3. However, the problem of this solution is that the precision of ink jet feeding is limited, and accurate feeding cannot be realized for products with a high-resolution ratio. Or, as shown in FIG. 4, a color filter unit is added above the oil drop layer to realize color display. However, this solution will cause a large increase of the thickness of the product, which is a severe problem in product thinning and flexible display.

For an electronic paper that employs electrophoretic display mode, black or white electrophoretic particles are employed for this electrophoretic display mode, and the electrophoretic display particles are arranged orderly by changing an electric field applied, so that color development may be attained to present different pictures. As shown in FIG. 5, microcapsules containing black electrophoretic particles and white electrophoretic particles are formed between a lower white substrate formed with transparent electrodes and the upper transparent electrodes; wherein the black electrophoretic particles and the white electrophoretic particles contain different charges respectively, and when a voltage is applied to the substrate, the black electrophoretic particles and the white electrophoretic particles move to the upper and lower region of the microcapsules respectively, thus black-and-white display of the electronic paper can be realized. However, currently there is no color electronic paper that employs electrophoretic display mode.

In conclusion, the color display of an electronic paper cannot be well realized in the prior art.

SUMMARY

The embodiments of the present invention provide an active substrate, an electrophoretic display device and an electrowetting display device, thereby realizing the color display of an electronic paper.

One embodiment of the present invention provides an active substrate, which comprises a first substrate and a pixel electrode layer formed on the first substrate, and further comprises a color filter layer formed on the pixel electrode layer and a protective layer formed on the color filter layer, wherein the color filter layer comprises: a red sub-pixel unit, a green sub-pixel unit and a blue sub-pixel unit that are sequentially arranged;

the material of the red sub-pixel unit is a quantum dot material that emits red light when excited by the ambient light;

the material of the green sub-pixel unit is a quantum dot material that emits green light when excited by the ambient light; and the material of the blue sub-pixel unit is a quantum dot material that emits blue light when excited by the ambient light.

The above active substrate according to the embodiment of the present invention employs a quantum dot material to form the color filter layer, the intensity and stability of the light emitted by the quantum dot material when excited by a light are both good, therefore, under the irradiation of the ambient light, lights of the three-primary colors including red, green and blue lights can be respectively emitted by different sub-pixel units at high performance, thereby color display may be realized when is applied to an electronic paper display device.

According to one embodiment of the present invention, the material of the pixel electrode layer is a conductive material with a reflection coefficient greater than 90%. By employing a conductive material with a high reflection coefficient, the utilization of an incident light can be improved, therefore, when applied to an electronic paper display device, color display with a high brightness can be realized even if the ambient light is dark.

According to one embodiment of the present invention, the material of the protective layer is transparent resin with a thermosetting temperature lower than 120° C. In the current quantum dot material, the tolerable temperature of the quantum dot material generally does not exceed 120° C., thus when the thermosetting temperature of the material of the protective layer is lower than 120° C., the quantum dot material will not be destroyed during formation of the protective layer.

According to one embodiment of the present invention, the thickness of the color filter layer is 10-30 nm. The grain size of the quantum dot material is on a nanometre level, therefore, if single-layer distribution of the quantum dot material can be realized, the excited luminescence efficiency thereof will be 100%; however, it is very difficult to realize single-layer distribution as limited by the preparation process and cost. In the present invention, the thickness of the film pattern is suitably between 10-30 nm, because with such a thickness, first of all, the process is easy to implement, and the luminous efficacy of the emergent light can be guaranteed.

According to one embodiment of the present invention, the thickness of the protective layer is 0.5-2 um. Under the premise that the protective layer can function to protect the quantum dot material, the smaller the thickness is, the higher the transmittance of the light beam will be; when applied to a display device, the brightness of the display device can be further improved.

One embodiment of the present invention provides an electrophoretic display device, which comprises:

the above active substrate;

an upper substrate arranged opposite to the active substrate;

a control wall formed on the active substrate, wherein the control wall is electrically connected with the pixel electrode layer and extends to the upper substrate; and an insulating wall that is formed outside the control wall and surrounds the control wall; wherein the control wall, the upper substrate and the active substrate construct a plurality of cavities, and each of the cavities corresponds to each region which corresponds to one sub-pixel unit, a microcapsule is provided in each of the cavities, and the microcapsule is filled with a transparent fluid and electrophoretic particles that are moveable in the transparent fluid.

In the above electrophoretic display device according to the embodiment of the present invention, by employing the above active substrate and providing a control wall that is electrically connected with the pixel electrode layer, the electrophoretic particles can be controlled to aggregate when a voltage is applied to the pixel electrode layer and the control wall; therefore, under the irradiation of the ambient light, the red, green or blue light beams emitted by the quantum dot material of the sub-pixel units can enter the human eyes, thereby color display can be realized.

One embodiment of the present invention provides an electrowetting display device, which comprises:

the above active substrate, wherein the surface of the protective layer of the active substrate is a hydrophobic surface;

an upper substrate arranged opposite to the active substrate;

a hydrophilic isolation structure formed on the protective layer of the active substrate, wherein the height of the hydrophilic isolation structure is less than the distance between the protective layer and the upper substrate, and the hydrophilic isolation structure and the protective layer form a plurality of spaces, each of the spaces corresponds to each region which corresponds to one sub-pixel unit;

a first fluid layer filled in the spaces formed by the protective layer and the hydrophilic isolation structure; and a transparent second fluid layer filled in the spaces formed by the first fluid layer and the upper substrate.

In the above electrowetting display device according to the embodiment of the present invention, by employing the above active substrate, when the fluid of the first fluid layer aggregates towards the hydrophilic isolation structure, the fluid on the second fluid layer is tiled on the hydrophobic surface; therefore, under the irradiation of the ambient light, the red, green or blue light beams emitted by the quantum dot material of the sub-pixel unit can enter the human eyes, thereby color display can be realized. Meanwhile, the thickness of the color filter layer that employs a quantum dot material is very thin, thus the overall thickness of the electrowetting display device can be significantly thinned relative to the prior art.

One embodiment of the present invention provides an electrophoretic display device, comprising:

an upper substrate provided with a first electrode;

an active substrate that is arranged opposite to the upper substrate and provided with a pixel electrode; and an insulating wall that is provided between the active substrate and the upper substrate; wherein the insulating wall, the upper substrate and the active substrate construct a plurality of cavities, each of the cavities is filled with a microcapsule, the microcapsule is filled with a fluid and electrophoretic particles; wherein the electrophoretic particles are moveable in the fluid under the control of an electric field formed by the first electrode and the pixel electrode; and the colors of the fluids filled in three adjacent microcapsules are red, green and blue.

In the above electrophoretic display device according to the embodiment of the present invention, by filling a red, a green and a blue fluid in the microcapsules, when the electrophoretic particles are controlled to move to the lower region of a microcapsule, color display can be realized under the irradiation of the ambient light.

DETAILED DESCRIPTION

The embodiments of the present invention provide an active substrate, an electrophoretic display device and an electrowetting display device, thereby realizing the color display of an electronic paper.

The technical solutions of the embodiments of the present invention will be clearly and fully described below in conjunction with the drawings in the embodiment of the present invention. Apparently, the embodiments described are only a part of the embodiments of the present invention, rather than all embodiments of the present invention. All other embodiments made by one skilled in the art based on the embodiments in the present invention without creative work all fall into to protection scope of the present invention.

First of all, quantum dot material will be illustrated.

Quantum dot generally refers to a kind of nanoparticle consisted of elements of II-VI group or III-V group element, it may emit fluorescence when excited by the ambient light, and the luminescent spectrum may be controlled by changing the size of the quantum dot, and the intensity and stability of the fluorescence are both good, thus it is an excellent photoluminescent material. There are may types of quantum dots, representatively, CdS, CdSe, CdTe, ZnO, ZnS, ZnSe, ZnTe and the like from II-VI groups, and GaAs, GaP, GaAs, GaSb, HgS, HgSe, HgTe, InAs, InP, InSb, AlAs, AlP, AlSb and the like from III-V groups. Here, according to different sizes prepared, the lights emitted by the quantum dots of the same substance will be different.

The active substrate according to the present invention will be illustrated below.

Figure 6:
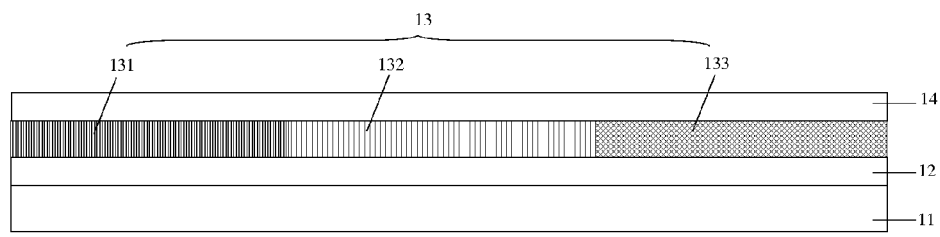
FIG. 6 is a sectional structural representation of an active substrate according to one embodiment of the present invention.

As shown in FIG. 6, one embodiment of the present invention provides an active substrate, which includes a first substrate 11 and a pixel electrode layer 12 formed on the first substrate 11, and further includes a color filter layer 13 formed on the pixel electrode layer 12 and a protective layer 14 formed on the color filter layer 13, wherein the color filter layer 13 includes: a red sub-pixel unit 131, a green sub-pixel unit 132 and a blue sub-pixel unit 133 that are sequentially arranged;

The material of the red sub-pixel unit 131 is a quantum dot material that emits red light when excited by the ambient light;

The material of the green sub-pixel unit 132 is a quantum dot material that emits green light when excited by the ambient light; and The material of the blue sub-pixel unit 133 is quantum dot material that emits blue light when excited by the ambient light.

The above active substrate according to the embodiment of the present invention employs a quantum dot material as the color filter layer, and since the intensity and stability of the light emitted by the quantum dot material when excited by a light are both good, under the irradiation of the ambient light, lights of the three-primary colors including red, green and blue lights can be respectively emitted by different sub-pixel units at high performance, thereby color display may be realized when applied to an electronic paper display device.

During specific implementation, the pixel electrode layer in the above active substrate is generally controlled by an active structure, for example, it may be controlled by a TFT array. Meanwhile, the first substrate is generally a white underlayer, for example, white glass or resin and the like may be employed. In the embodiment of the present invention, the prior art may be employed for the structure and material of the first substrate and the pixel electrode, no detailed description will be given again here.

Moreover, during the process of forming the color filter layer, first of all, a quantum dot material that emits red light is deposited, and then it is exposed and developed via a yellow light process to form a red sub-pixel unit, and a resin protective layer is coated thereon; then, a quantum dot material that emits green light is deposited, and it is exposed and developed via a yellow light process to form a green sub-pixel unit, and a resin protective layer is coated thereon; finally, a quantum dot material that emits blue light is deposited, and then it is exposed and developed via a yellow light process to form a blue sub-pixel unit via the same preparation process, and a resin protective layer is coated thereon. However, the preparation process of the color filter layer with quantum dot is not limited to the above preparation sequence. It should be noted that the above preparation process employs the prior art, and no detailed description will be given again here.

In one embodiment of the present invention, the material of the pixel electrode layer is a conductive material with a reflection coefficient greater than 90%. The conductive material with a high reflection coefficient includes a highly reflective material such as a combination of ITO/Ag/ITO, a combination of Mo/Al and a combination of ITO/APC/ITO. By employing a conductive material with a high reflection coefficient, the utilization of an incident light can be improved, thus when applied to an electronic paper display device, color display with a high brightness can be realized even if the ambient light is dark.

In one embodiment of the present invention, the material of the protective layer is a transparent resin with a thermosetting temperature lower than 120° C. In the current quantum dot materials, the tolerable temperature of the quantum dot material generally does not exceed 120° C., thus when the thermosetting temperature of the material of the protective layer is lower than 120° C., the quantum dot material will not be destroyed during formation of the protective layer.

In one embodiment of the present invention, the thickness of the color filter layer is 10-30 nm. The grain size of the quantum dot material is on a nanometre level, therefore, if single-layer distribution of the quantum dot material can be realized, the excited luminescence efficiency thereof will be 100%; however, it is very difficult to realize single-layer distribution as limited by the preparation process and cost. In the present invention, the thickness of the film pattern is suitably between 10-30 nm, because with such a thickness, first of all, the process is easy to implement, and the luminous efficacy of the emergent light can be guaranteed.

In one embodiment of the present invention, the thickness of the protective layer is 0.5-2 um. Under the premise that the protective layer can function to protect the quantum dot material, the smaller the thickness is, the higher the transmittance of the light beam will be; when applied to a display device, the brightness of the display device can be further improved.

The active substrate according to the embodiment of the present invention has been illustrated in detail above, and a display device according to one embodiment of the present invention will be illustrated below.

First of all, an electrophoretic display device according to one embodiment of the present invention will be illustrated.

Figure 7:
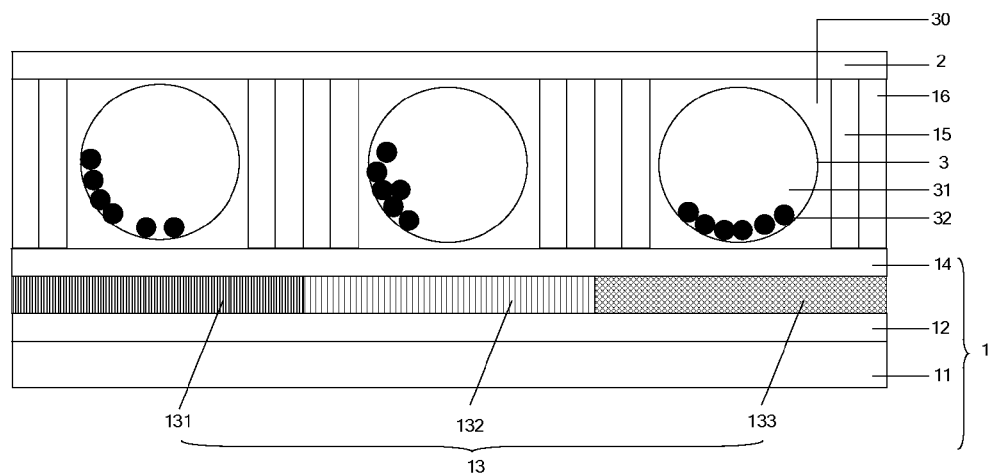
FIG. 7 is a sectional structural representation of an electrophoretic display device according to one embodiment of the present invention.
Figure 8:
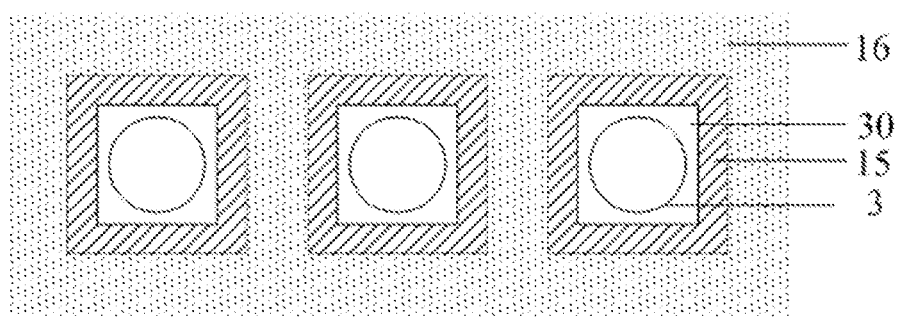
FIG. 8 is a schematic diagram showing the positional relationship of a control wall and an insulating wall in the electrophoretic display device shown in FIG. 7.

As shown in FIG. 7, an electrophoretic display device according to one embodiment of the present invention includes:

the above active substrate 1;

an upper substrate 2 arranged opposite to the active substrate 1;

a control wall 15 formed on the active substrate 1, wherein the control wall 15 is electrically connected with the pixel electrode layer 12 (not shown in FIG. 7) and extends to the upper substrate 2; and an insulating wall 16, which is formed outside the control wall 15 and surrounds the control wall 15, as shown in FIG. 8;

referring again to FIG. 7, the control wall 15, the upper substrate 2 and the active substrate 1 construct a plurality of cavities 30, and each of the cavities 30 corresponds to each region which corresponds to one sub-pixel unit, that is, each cavity 30 corresponds to an upper region corresponding to a red sub-pixel unit or a green sub-pixel unit or a blue sub-pixel unit, a microcapsule 3 is provided in each of the cavities 30, and the microcapsule 30 is filled with a transparent fluid 31 and a plurality of electrophoretic particles 32 that are moveable in the transparent fluid 31.

In the above electrophoretic display device according to the embodiment of the present invention, by employing the above active substrate and providing a control wall that is electrically connected with the pixel electrode layer, the electrophoretic particles (black) can be controlled to aggregate when a voltage is applied on the pixel electrode layer and the control wall, therefore, under the irradiation of the ambient light, the red, green or blue light beams emitted by the quantum dot material of the sub-pixel units can enter the human eyes, thereby color display can be realized; when no voltage is applied to the pixel electrode layer and the control wall, the black electrophoretic particles will be located on the bottom of the microcapsules, thus the ambient light will to totally absorbed, thereby it displays black.

In one embodiment of the present invention, the control wall may be made of gold balls with a diameter on the magnitude of several micrometers, and the gold balls may be deposited on a substrate via spray coating; at a position that is electrically connected with the pixel electrode layer, for example, a via hole may be employed to realize the electrical connection between the control wall and the pixel electrode layer. However, the electrical connection between the control wall and the pixel electrode layer may also be realized in other modes, which is not limited here.

In one embodiment of the present invention, acrylic resin may be employed as the material of the insulating wall, for example, a resin of JSR SU-8 series; here, the insulating wall functions, on one hand, to insulate the control wall of each sub-pixel unit from each other, and on the other hand, to support.

Figure 9:
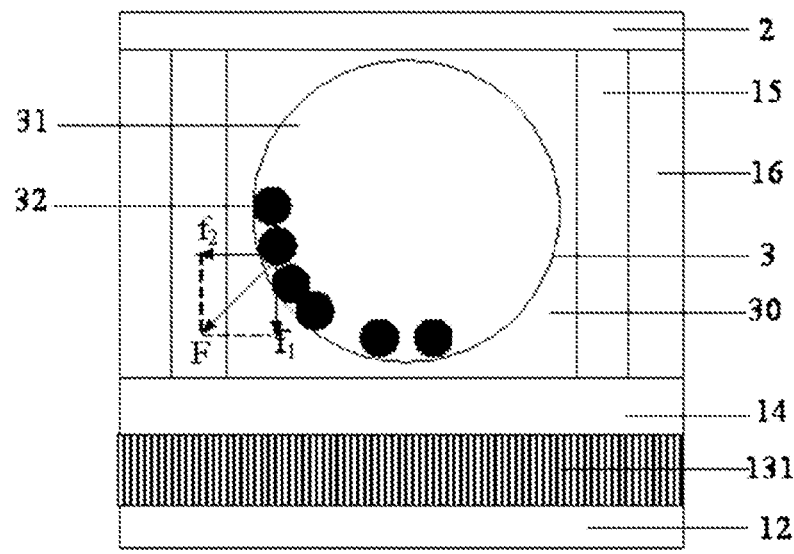
FIG. 9 is a schematic diagram showing an electrophoretic particle under stress in the electrophoretic display device shown in FIG. 7.

During specific implementation, when it requires to realize color display, for electrophoretic particles that carry negative charges for example, as shown in FIG. 9, in the region corresponding to one red sub-pixel unit 131, a positive voltage is applied to the pixel electrode layer 12 and the control wall 15 via the active structure when red display needs to be realized, an acting force $f_1$ is generated on the electrophoretic particle 32 by the pixel electrode layer 12, and an acting force $f_2$ is generated on the electrophoretic particle 32 by the control wall 15, and finally, the electrophoretic particle 32 is driven to move along the direction of the resultant force F in the transparent fluid 31 and aggregate towards the direction of the bottom corner of the cavity. When display of different gray scales is required, it only needs to change the magnitude of the drive voltage of the active structure, thereby different degrees of aggregation of the electrophoretic particles may be realized, so that color display of different gray scales may be realized.

An electrowetting display device according to one embodiment of the present invention will be illustrated below.

Figure 10:
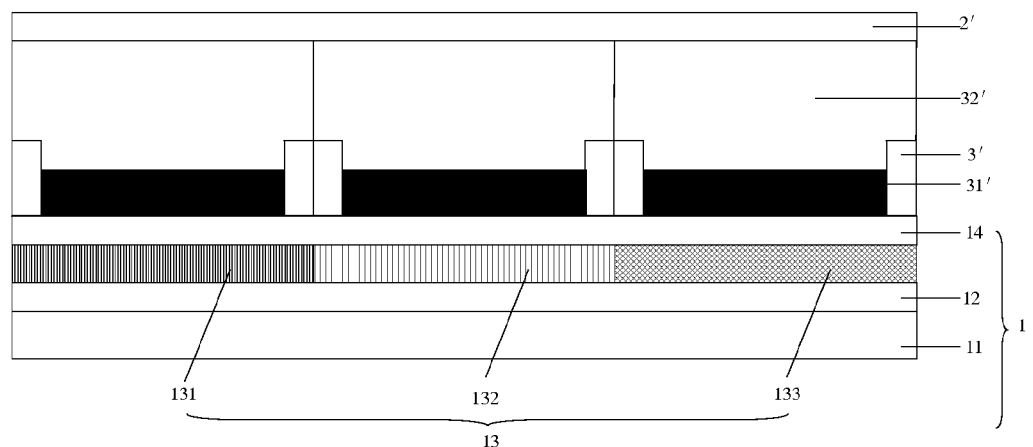
FIG. 10 is a sectional structural representation of an electrowetting display device according to one embodiment of the present invention.

As shown in FIG. 10, an electrowetting display device according to one embodiment of the present invention includes:

the above active substrate 1, wherein the surface of the protective layer 14 of the active substrate 1 is a hydrophobic surface;

an upper substrate 2' arranged opposite to the active substrate 1;

a hydrophilic isolation structure 3' formed on the protective layer 14 of the active substrate 1, wherein the height of the hydrophilic isolation structure 3' is less than the distance between the protective layer 14 and the upper substrate 2', and the hydrophilic isolation structure 3' and the protective layer 14 form a plurality of spaces, each of the spaces corresponds to each region which corresponds to one sub-pixel unit, that is, each of the spaces corresponds to an upper region corresponding to a red sub-pixel unit or a green sub-pixel unit or a blue sub-pixel unit;

a first fluid layer 31' that is filled in the space formed by the protective layer 14 and the hydrophilic isolation structure 3'; and a transparent second fluid layer 32' that is filled in the space formed by the first fluid layer 31' and the upper substrate 2'.

During specific implementation, the hydrophilic isolation structure 3' may employ a cofferdam structure; the first fluid layer 31' comprises a nontransparent nonpolar solution, and the second fluid layer 32' comprises a transparent polar fluid. The material of the first fluid layer 31' generally comprises a black ink, a nontransparent color oil or an alkane similar to hexadecane; the second fluid layer 32' generally comprises a transparent conducting liquid insoluble with the first fluid layer 31', and it may be water or a salt solution. Here, the prior art may be employed, and no detailed description will be given again here.

Figure 11:
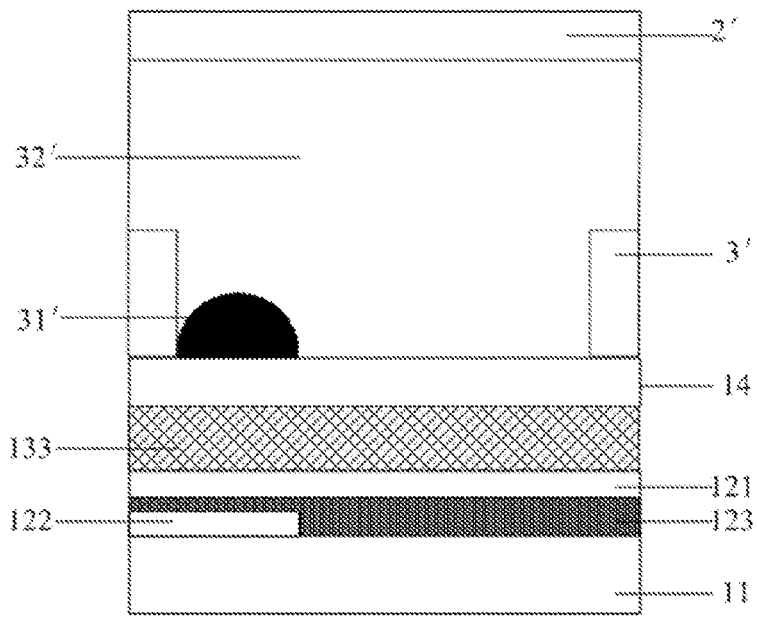
FIG. 11 is a sectional structural representation of another electrowetting display device according to one embodiment of the present invention.

Moreover, the upper substrate 2' may also include a transparent electrode so as to form a control electric field with the pixel electrode layer of the active substrate; or, the upper substrate 2' may not include a transparent electrode, instead, a transversal control electric field may be formed in the active substrate by designing the structure of the pixel electrode layer; for example, for a region corresponding to any one of the green sub-pixel unit 133, as shown in FIG. 11, the pixel electrode layer includes a first pixel electrode 121 and a second pixel electrode 122, wherein an insulating layer 123 is provided between the first pixel electrode 121 and the second pixel electrode 122. As driven by the active structure, a transversal control electric field is formed between the first pixel electrode 121 and the second pixel electrode 122. Of course, the first pixel electrode of each sub-pixel unit may be controlled by the same active structure, i.e., the first pixel electrode may function as a common electrode.

Figure 12:
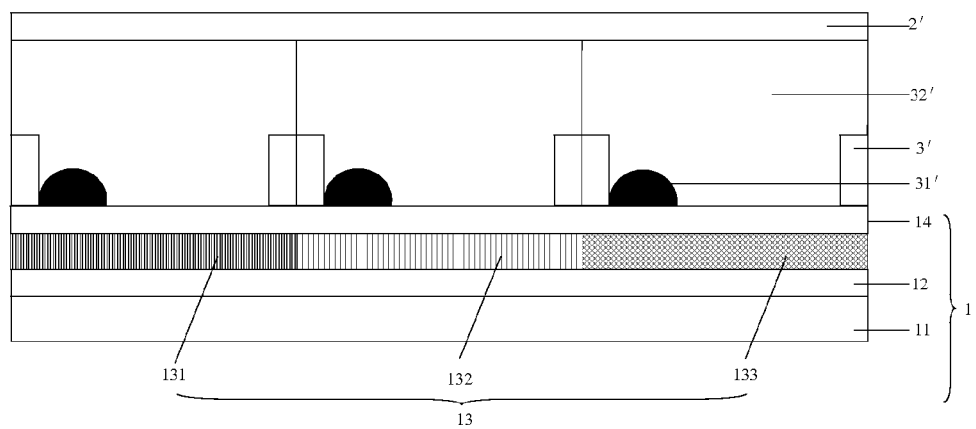
FIG. 12 is a schematic diagram showing the position of the first fluid layer during the color display of the electrowetting display device shown in FIG. 10.

During specific implementation, when the display device displays, the black ink functions as an optical gate to control the penetration amount of the incident light (i.e., the ambient light). When no voltage is applied and no control electric field is formed, the black ink will cover the hydrophobic surface of the protective layer 14 uniformly, as shown in FIG. 10, and at this time, it is in a light-tight state, and the region corresponding to the sub-pixel unit displays in a dark state; when a voltage is applied and a control electric field is formed, due to the action of the electric field, polarized charges will be generated on the hydrophobic surface of the protective layer 14, and the polarized charges generated will enhance the affinity of the hydrophobic surface to a polar aqueous solution, so that the polar aqueous solution will spread on the hydrophobic surface, and the black ink will be driven to the corner of the region corresponding to the sub-pixel unit, as shown in FIG. 11 or FIG. 12, so that the red, green or blue light beams emitted by the sub-pixel unit can pass through and enter human eyes, thereby color display can be realized.

In the above electrowetting display device according to the embodiment of the present invention, by employing the above active substrate, when the fluid on the first fluid layer aggregates towards the hydrophilic isolation structure, the fluid on the second fluid layer is tiled on the hydrophobic surface; therefore, under the irradiation of the ambient light, the red, green or blue light beams emitted by the quantum dot material of the sub-pixel unit can pass through and enter human eyes, thereby color display can be realized. Meanwhile, the thickness of the color filter layer that employs a quantum dot material is very thin, thus the overall thickness of the electrowetting display device can be significantly thinned relative to the prior art.

Figure 1:
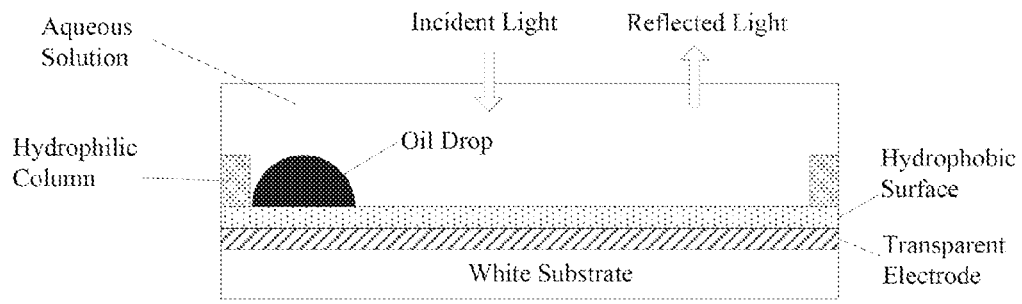
FIG. 1 is a schematic diagram showing the white display of a black-and-white electrowetting display device of the prior art.
Figure 2:
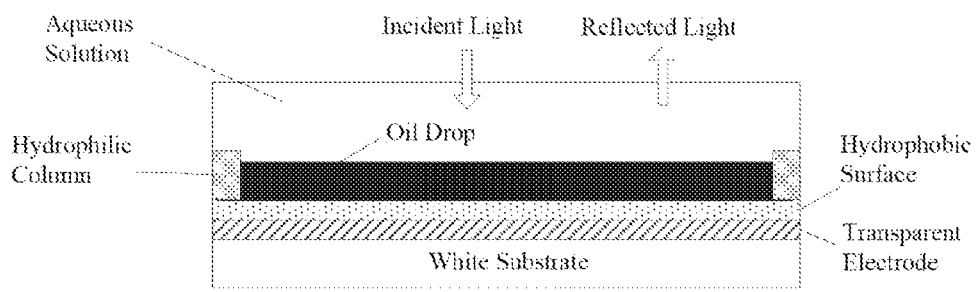
FIG. 2 is a schematic diagram showing the black display of a black-and-white electrowetting display device of the prior art.
Figure 3:
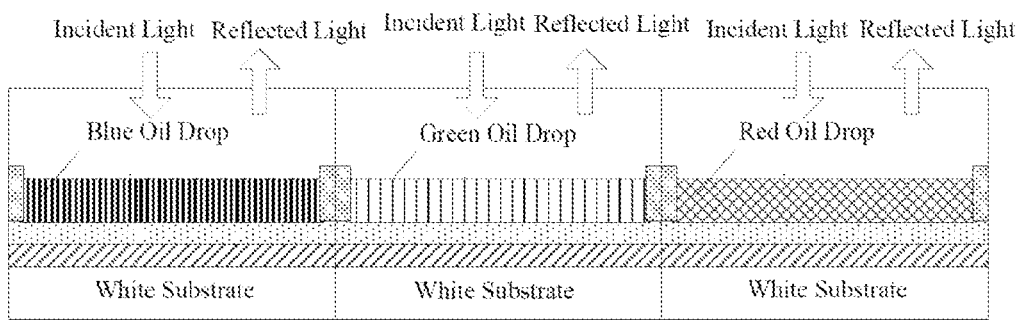
FIG. 3 is a structural representation of a color electrowetting display device of the prior art.

Moreover, in the prior art solution shown in FIG. 3, oil drops of the three-primary color including red, green and blue are respectively fed into each sub-pixel unit, since the precision of ink jet feeding is limited, accurate feeding cannot be realized for products with a high-resolution ratio. However, in the embodiment of the present invention, it is not required to respectively feed a black ink into the space corresponding to each sub-pixel unit, instead, after the black ink is fed, the black ink will be dispersed in the space corresponding each sub-pixel unit, thus accurate feeding may be realized for products with a high-resolution ratio.

Figure 4:
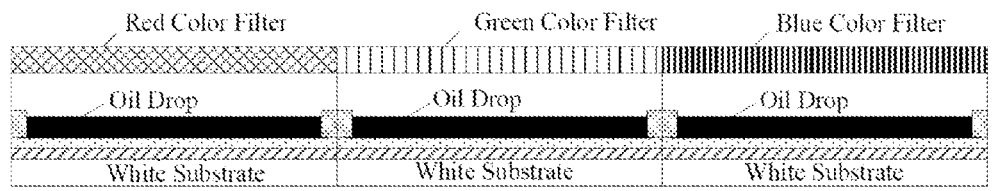
FIG. 4 is a structural representation of another color electrowetting display device of the prior art.
Figure 5:
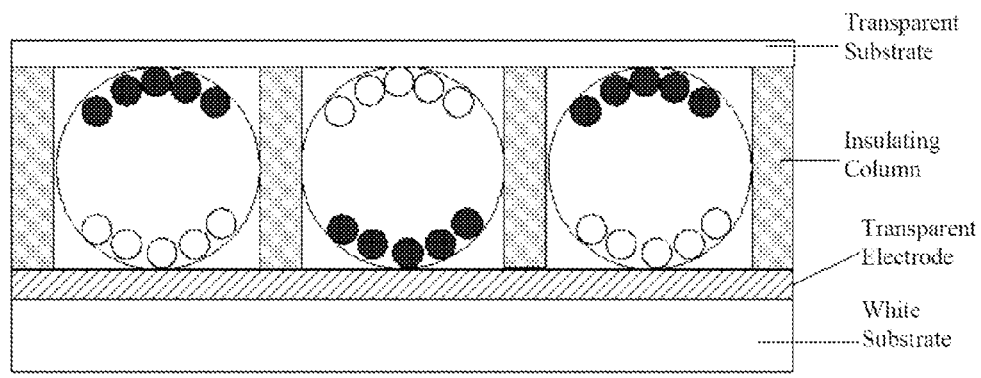
FIG. 5 is a structural representation of a black-and-white electrophoretic display device of the prior art.

Moreover, in the prior art solution as shown in FIG. 4, the light transmittance of the color filter of each color is only about 10%, thus, under the irradiation of the ambient light, very few light beams enter human eyes; especially, in the case of dark ambient light, it is highly possible that the display device shown in FIG. 4 cannot display normally. However, in the above electrowetting display device according to the embodiment of the present invention, the thickness of the color filter layer structure formed by the quantum dot material is very small, the transmittance of the incident ambient light is about 90%, and after being reflected by a transparent electrode with a high reflection coefficient, most of the ambient light can enter the color filter layer of the quantum dot material and emits red, green or blue light respectively, thus the utilization ratio of the ambient light is high, and display can be normally realized even if in the case of dark ambient light.

Another electrophoretic display device according to one embodiment of the present invention will be illustrated below.

Figure 13:
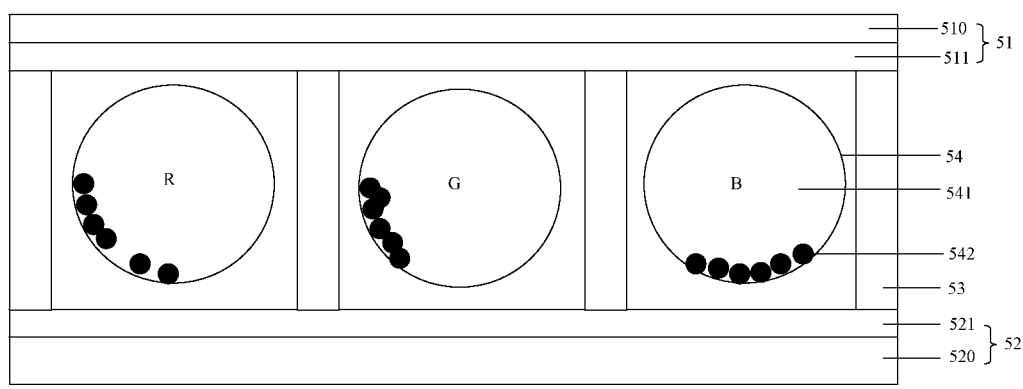
FIG. 13 is a sectional structural representation of another electrophoretic display device according to the embodiment of the present invention.

Referring to FIG. 13, one embodiment of the present invention provides another electrophoretic display device, which includes:

an upper substrate 51, which includes an upper underlayer 510 and a first electrode 511;

an active substrate 52 arranged opposite to the upper substrate 51, which includes a lower underlayer 520 and a pixel electrode 521; and an insulating wall 53 arranged between the active substrate 52 and the upper substrate 51; wherein the insulating wall 53, the upper substrate 51 and the active substrate 52 construct a plurality of cavities, each of the cavities is provided with a microcapsule 54, and the microcapsule 54 is filled with a fluid 541 and electrophoretic particles 542; wherein the electrophoretic particles 542 are moveable in the fluid 541 under the control of an electric field formed by the first electrode 511 and the pixel electrode 521; moreover, the colors of the fluids filled in three adjacent microcapsules are red (R), green (G) and blue (B). The color of the electrophoretic particle 542 is black.

During specific implementation, for black electrophoretic particles carrying negative charges for example, when color display is required, by applying negative voltage to the first electrode and applying positive voltage to the pixel electrode, the black electrophoretic particles carrying negative charges are controlled to sink, thus the color of the fluid in the microcapsule may be displayed; when black display is required, by applying positive voltage to the first electrode and applying negative voltage to the pixel electrode, the black electrophoretic particles carrying negative charges are controlled to ascend, and the black electrophoretic particles absorb the incident ambient light, thus it displays black. Here, the prior art is employed for the control method of the electrophoretic particles, and no detailed description will be given again here.

In the above electrophoretic display device according to the embodiment of the present invention, by filling a red, a green and a blue fluid in the microcapsules, when the electrophoretic particles are controlled to move to the lower region of a microcapsule, color display can be realized under the irradiation of the ambient light.

In conclusion, the active substrate according to the embodiment of the present invention employs a quantum dot material to form the color filter layer, and since the intensity and stability of the light emitted by the quantum dot material when excited by a light are both good, under the irradiation of the ambient light, lights of the three-primary colors including red, green and blue lights can be respectively emitted by different sub-pixel units at high performance, thereby color display may be realized when applied to an electronic paper display device. Moreover, the electrophoretic display device according to the embodiment of the present invention employs the above active substrate, and color display of the electrophoretic display device is realized; and the electrowetting display device according to the embodiment of the present invention employs the above active substrate, color display of the electrowetting display device is realized, moreover, the display resolution ratio is improved, and the display brightness of the display device is improved by improving the transmittance of the light beam. Additionally, the embodiment of the present invention further provides another electrophoretic display device, by filling a plurality of cavities constructed by the insulating wall, the upper substrate and the active substrate with microcapsules, and by filling the microcapsules with fluids of different colors and black electrophoretic particles, color display of the electrophoretic display device can be realized.

The present invention has been described by referring to the flow chart and/or block diagram of the method, device (system) and computer program product according to the embodiments of the present invention. It should be understood that, each flow and/or block in the flow chart and/or block diagram, and the combination of the flows and/or blocks in the flow chart and/or block diagram may be realized via computer program instructions. These computer program instructions may be provided to a general-purpose computer, a special-purpose computer, an embedded processor or the processor of other programmable data-processing devices to produce a machine, thereby the instructions executed by the processor of a computer or other programmable data-processing devices can produce a device for realizing the functions specified in one or more flows of the flow chart and/or one or more blocks of the block diagram.

These computer program instructions may also be stored in a computer-readable memory that can guide a computer or other programmable data-processing devices to work in a specific mode, so as to make the instructions stored in the computer-readable memory produce a manufactured article that includes a specified equipment, which can realize the functions specified in one or more flows of the flow chart and/or one or more blocks of the block diagram.

These computer program instructions may also be loaded to a computer or other programmable data-processing devices so as to perform a series of operation steps on the computer or other programmable devices, so as to realize computer-implemented processing, so that the instructions executed on the computer or other programmable devices can provide the steps for realizing the functions specified in one or more flows of the flow chart and/or one or more blocks of the block diagram.

Apparently, various modifications and variations may be made by one skilled in the art without departing from the spirit and scope of the present invention. Thus, if these modifications and variations of the present invention fall into the scope of the claims of the present invention and their equivalents, the present invention tends to encompass these modifications and variations.

What is claimed is:

1. An electrophoretic display device, comprising:
an active substrate comprising;
   a first substrate;
   a pixel exectrode layer formed on the first substrate;
   a color filter layer formed on the pixel electrode layer;
   a protective layer formed on the color filter layer,
      wherein:
         the color filter layer comprises a red sub-pixel unit, a green sub-pixel unit, and a blue sub-pixel unit that are sequentially arranged;
         a material of the red sub-pixel unit is a quantum dot material that emits red light when excited by an ambient light;
         a material of the green sub-pixel unit is a quantum dot material that emits green light when excited by the ambient light; and
         a material of the blue sub-pixel unit is a quantum dot material that emits blue light when excited by the ambient light;
an upper substrate arranged opposite to the active substrate;
a control wall formed on the active substrate, wherein the control wall is electrically connected with the pixel electrode layer and extends to the upper substrate; and
an insulating wall that is formed outside the control wall and surrounds the control wall;
wherein:
   the control wall, the upper substrate and the active substrate construct a plurality of cavities,
   each of the cavities corresponds to a region that corresponds to one of the red sub-pixel unit, the green sub-pixel unit and the blue sub-pixel unit,
   a microcapsule is provided in each of the cavities, and
   the microcapsule is filled with a transparent fluid and electrophoretic particles that are moveable in the transparent fluid.

2. The electrophoretic display device according to claim 1, wherein in the active substrate, a material of the pixel electrode layer is a conductive material with a reflection coefficient greater than 90%.

3. The electrophoretic display device according to claim 1, wherein in the active substrate, a material of the protective layer is transparent resin with a thermosetting temperature lower than 120° C.

4. The electrophoretic display device according to claim 1, wherein in the active substrate, a thickness of the color filter layer is 10-30 nm.

5. The electrophoretic display device according to claim 1, wherein in the active substrate, a thickness of the protective layer is 0.5-2 um.

6. An electrowetting display device, comprising:
an active substrate comprising:
   a first substrate
   a pixel electrode layer arranged on the first substrate,
   a color filter layer arranged on the pixel electrode layer; and
   a protective layer arranged on the color filter layer, wherein a surface of the protective layer of the active substrate is a hydrophobic surface;
a hydrophilic isolation structure arranged on the protective layer of the active substrate, wherein a height of the hydrophilic isolation structure is less than a distance between the protective layer and an upper substrate, arranged opposite to the active substrate, and the hydrophilic isolation structure and the protective layer form a plurality of spaces, each of the spaces corresponds to a region that corresponds to one of a red sub-pixel unit, a green sub-pixel unit, and a blue sub-pixel unit;
a first fluid layer arranged on the protective layer and filled in spaces formed by the protective layer and the hydrophilic isolation structure; and
a transparent second fluid layer filled in the spaces formed by the first fluid layer and the upper substrate, and
the upper substrate;
wherein:
   the color filter layer comprises the red sub-pixel unit, the green sub-pixel unit and the blue sub-pixel unit that are sequentially arranged,
   a material of the red sub-pixel unit is a quantum dot material that emits red light when excited by an ambient light,
   a material of the green sub-pixel unit is a quantum dot material that emits green light when excited by the ambient light, and
   a material of the blue sub-pixel unit is a quantum dot material that emits blue light when excited by the ambient light.

7. The electrowetting display device according to claim 6, wherein in the active substrate, a material of the pixel electrode layer is a conductive material with a reflection coefficient greater than 90%.

8. The electrowetting display device according to claim 6, wherein in the active substrate, a material of the protective layer is transparent resin with a thermosetting temperature lower than 120° C.

9. The electrowetting display device according to claim 6, wherein in the active substrate, a thickness of the color filter layer is 10-30 nm.

10. The electrowetting display device according to claim 6, wherein in the active substrate, a thickness of the protective layer is 0.5-2 um.

11. The electrowetting display device according to claim 6, wherein the upper substrate further comprises a transparent electrode.

12. The electrowetting display device according to claim 6, wherein in the active substrate, the pixel electrode layer comprises a first pixel electrode and a second pixel electrode, an insulating layer is provided between the pixel electrode layer having a first pixel electrode and the pixel electrode layer having a second pixel electrode.

\* \* \* \* \*